United States Patent
O'Riorden et al.

(10) Patent No.: US 8,842,956 B2
(45) Date of Patent: Sep. 23, 2014

(54) NON-KINK, NON-HOCKLING OPTICAL CABLE

(75) Inventors: Stephen M. O'Riorden, Stowe, MA (US); Amaresh Mahapatra, Acton, MA (US)

(73) Assignee: Linden Photonics, Inc., Westford, MA (US)

( * ) Notice: Subject to any disclaimer, the term of this patent is extended or adjusted under 35 U.S.C. 154(b) by 8 days.

(21) Appl. No.: 13/424,706

(22) Filed: Mar. 20, 2012

(65) Prior Publication Data

US 2012/0257863 A1    Oct. 11, 2012

Related U.S. Application Data

(60) Provisional application No. 61/473,143, filed on Apr. 7, 2011.

(51) Int. Cl.
*G02B 6/44* (2006.01)
*G02B 6/00* (2006.01)

(52) U.S. Cl.
CPC .......... *G02B 6/4477* (2013.01); *G02B 6/4478* (2013.01); *G02B 6/449* (2013.01); *G02B 6/443* (2013.01)
USPC .............. 385/109; 385/10; 385/108; 385/141

(58) Field of Classification Search
CPC ........ G02B 6/443; G02B 6/4432; G02B 6/44; G02B 6/4486; G02B 6/4478; G02B 6/447
USPC ......... 385/100–103, 106, 112, 113, 141, 108, 385/109
See application file for complete search history.

(56) References Cited

U.S. PATENT DOCUMENTS

| | | | |
|---|---|---|---|
| 4,167,305 A * | 9/1979 | Ichiba et al. | 385/141 |
| 6,064,007 A | 5/2000 | Bernstein et al. | |
| 7,570,853 B2 | 8/2009 | Mahapatra et al. | |
| 2008/0095507 A1* | 4/2008 | Mahapatra et al. | 385/102 |
| 2009/0060430 A1* | 3/2009 | Reed et al. | 385/107 |

OTHER PUBLICATIONS

Handbook of Optical Fibers and Cables, Hiroshi Murata, Marcel Dekker, Inc., 1988. Chapter 3, pp. 179-186.
Lusignea, R. W. (1999), Orientation of LCP blown film with rotating dies. Polymer Engineering & Science, 39: 2326-2334. doi: 10.1002/pen.11621.

* cited by examiner

*Primary Examiner* — Kaveh Kianni
*Assistant Examiner* — Hung Lam
(74) *Attorney, Agent, or Firm* — Francis J. Caufield

(57) ABSTRACT

A non-kink, non-hockling optical cable comprising an optical fiber capable of propagating light along its longitudinal axis. A buffer layer made of a soft plastic material surrounds the silica core and cladding, and a supplemental layer surrounds the buffer layer. The supplemental layer consists essentially of a liquid crystal polymer (LCP) material to enhance the tensile strength of the optical fiber. Finally, an encasing polymer layer with a breaking strain greater than 30%, surrounds the supplemental layer, to increase the flexibility of the optical cable.

7 Claims, 3 Drawing Sheets

NON-KINK, NON-HOCKLING OPTICAL CABLE

CROSS REFERENCE TO RELATED APPLICATION

This application claims the benefit of priority from U.S. Provisional Patent Application No. 61/473,143 filed on Apr. 7, 2011 in the name of Stephen M. O'Riorden, et al. with the title NON-KINK, NON-HOCKLING OPTICAL CABLE, the entire contents of which are incorporated herein by reference.

FIELD OF THE INVENTION

This invention generally relates to optical cable structures and, more particularly, to the structure and material composition of optical cables exhibiting high tensile strength and enhanced flexibility to reduce kinking and hockling.

BACKGROUND OF THE INVENTION

Optical cables are extensively used in military aircraft as interconnects in aircraft frames. Avionic interconnect applications, and Unmanned Aircraft applications, will benefit from development of a more rugged, durable, bend and kink insensitive, lighter weight optical cable fiber.

Optical cables are also used extensively in the operation of underwater vehicles, referred to as Remotely Operated Vehicles (ROVs). These vehicles are connected to the surface ship via a composite tether cable that consists of electrical cables for power and control and optical cables for data and real time video imagery. The optical cables are usually much thinner than the electrical cables and typically reside in the interstices between the electrical cables. It is critical that the optical cables be both high strength and flexible. The flexibility makes them survive the compressive forces that result from the surrounding massive electrical power, particularly during fabrication and also when the composite tether is wound around a mandrel. This is another application that would benefit from a high strength, non-kinking, low cost optical cable.

Another application is the use of optical tethers to maintain two way communication between a mother ship and a ROV deployed in the deep seas. As the ROV maneuvers in the water or on the ocean floor it may retrace its path so that the connected tether loops on itself. As the loop becomes tighter the cable will kink and the optical fiber may break or optical transmission will be impeded. (This is similar to a garden hose which is being pulled at one end and forms a loop somewhere along its length. Often the loop will become progressively tighter and form a kink and water will no longer flow through the garden hose). This phenomenon is called hockling.

It is desirable to have a non-hockling optical cable such that as a loop in the cable becomes smaller, it flips open forming a 360° twist instead of a kink. The twist has no effect on optical transmission while the kink is disastrous. Therefore it is desirable to have an optical cable that is high strength, non-kinking and non-hockling.

Thin, high tensile strength, low cost optical cables have been formed by extruding liquid crystal polymer (LCP) layers over standard commercially available optical fibers (U.S. Pat. No. 7,570,853). LCPs are thermoplastic polymers that have high tensile strength, high chemical resistance and excellent moisture barrier properties. However, LCPs are not very flexible so cables utilizing LCP are also not very flexible and thus prone to kinking when deployed in the field.

Consequently, it is a principal object of the present invention to provide optical cables of low-cost, high strength, and resistant to kinking and hockling.

It is another object of the present invention to provide optical cables incorporating LCP layers to enhance tensile strength and provide protection against moisture.

Other objects of the invention will be obvious and will, in part, appear hereinafter when the following detailed description is read in connection with the appended drawings.

SUMMARY OF THE INVENTION

This invention relates to the structure and material composition of an optical cable that is of low-cost, high tensile strength, flexible, and resistant to kinking, hockling, and moisture. The optical fiber cable comprises an optical fiber having a core having a given index of refraction and a cladding layer surrounding the core and having an index of refraction lower than that of said core so that the two in combination are capable of propagating light along the length of the optical fiber. A buffer layer made of a soft plastic material surrounds the silica cladding of the optical fiber. A supplemental layer consisting essentially of a liquid crystal polymer (LCP) material surround the buffer layer to enhance the tensile strength of the cable and provide moisture resistance. An encasing polymer layer with breaking strain greater than 30%, surrounds the supplemental layer to increase flexibility of the optical cable and make it resistant to kinking and hockling. Extrusion is used to form the cable's various thermoplastic layers over the LCP layer.

BRIEF DESCRIPTION OF THE DRAWINGS

The structure, operation, and methodology of the invention, together with other objects and advantages thereof, may best be understood by reading the detailed description in connection with the drawings in which each part has an assigned label and/or numeral that identifies it wherever it appears throughout the various drawings and wherein.

DETAILED DESCRIPTION OF INVENTION

Optical cable has been previously developed that uses a new class of materials, liquid crystal polymer (LCP), for use as extruded optical fiber buffer (See, e.g., U.S. Pat. No. 7,570, 853). Extruded LCPs have extremely high tensile strength so that the constructed cable also has high strength. For example, a commercially available single mode fiber with an outer diameter (OD) of 10 mil when jacketed with LCP to a diameter of 30 mil can have a breaking strength of greater than 50 lb. LCP resins are commercially available from several major suppliers—Ticona, Allied Chemicals, Dupont and Sumitomo. LCPs and suitable blends consisting of LCPs and other high performance thermoplastics such as fluoropolymers have the strength, barrier properties, and low cold creep of LCPs and, the flexibility of fluoropolymers. LCP and LCP blends can be designed to have the following advantages:

(a) No thermal degradation up to 450 C.
(b) No cold creep.
(c) Extremely low moisture absorption and transmission. No hydrolysis problem even at elevated temperatures.
(d) Excellent chemical stability—no effect of exposure for prolonged periods to aviation fuels, anti-freeze, organic solvents, sulfuric acid, chromic acid.
(e) High strength, high flexibility and kink resistant
(f) Low cost.
(g) Laser markable
(h) Both LCP and fluoropolymer are aircraft qualified materials—use as molded connectors on F-35.

Liquid crystal polymers (LCP), have been shown to have excellent moisture and oxygen barrier properties. LCPs have a factor of 100 lower moisture absorption, and transmission.

However optical cables with extruded LCP are not very flexible primarily because LCPs are not very flexible. One measure of flexibility in a plastic is the breaking strain which is the maximum strain that the plastic can be subjected to before it breaks. Flexible materials can stretch a lot—in excess of 50% of their length before they break. Breaking strain for LCPs is only about 1 to 3%.

Figure 1:
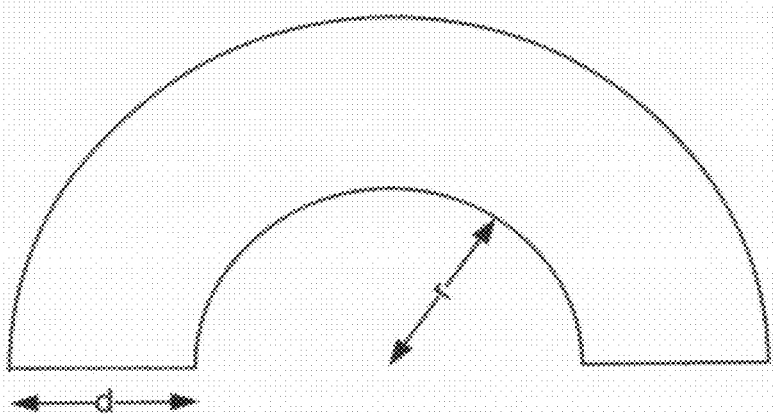
FIG. 1 is a diagrammatic plan view of a cable of diameter "d" bent through a 180° arc of inner radius "r"

A simple way to estimate the strain produced when a cable is bent in an arc of a specific radius is shown in FIG. 1. Assume the longitudinal center of the cable is unstrained, the outer edge is under tensile strain while the inner edge is under compressive strain.

$$\text{Length difference between inner and outer edge} = \pi d \quad (1)$$

Differential strain between inner and outer edge =

$$\pi d / \pi(r + d/2) == 2d/(2r + d)$$

Consider the previously discussed case of a commercially available singlemode fiber with an outer diameter (OD) of 10 mil jacketed with LCP to a diameter of 30 milcase. Assume the LCP has a breaking strain of 3%. Therefore in equation 1:
d=30 mil, Strain=3%
Therefore, minimum bend radius r=985 mil≈inch
Therefore, this cable will kink if the bend radius is 1" or smaller, which is not a very flexible cable.

For a non-kink, non-hockling cable we require a minimum bend radius of ¼ or less.

Figure 2A:
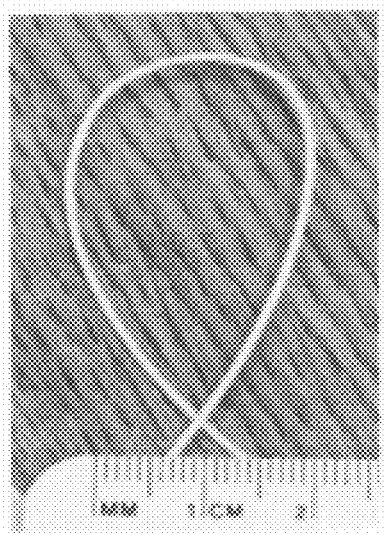
FIGS. 2a and 2b are photographs showing hockling in an LCP jacketed optical cable.
Figure 2B:
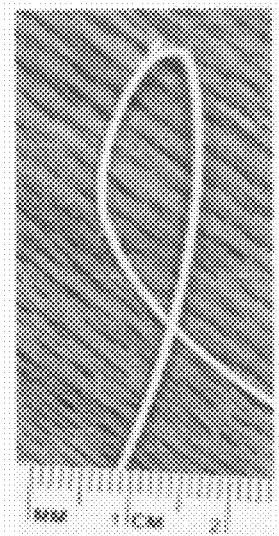

Hockling in an LCP jacketed optical fiber is shown in FIGS. 2a and 2b. The fiber appearing in the photographs of those figures was a commercial singlemode fiber with an outer diameter (OD) of 10 mil jacketed with LCP to a diameter of 30 mil. FIG. 2(a) shows the cable in an approximately 2 cm diameter loop, and FIG. 2(b) show a kink in the cable when the loop diameter was decreased.

Figure 3:
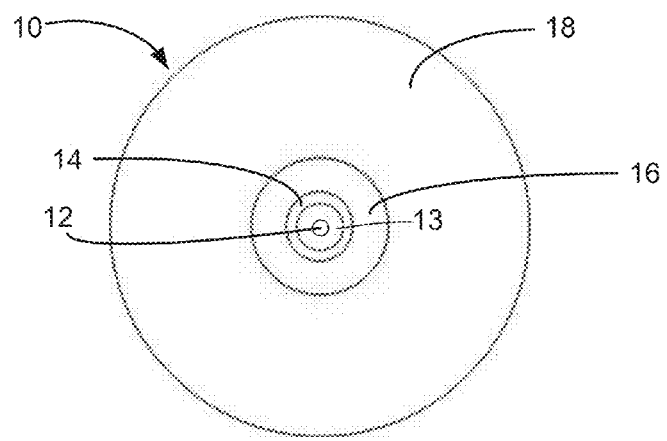
FIG. 3 is a diagrammatic cross-sectional view of a high strength, non-kinking, non-hockling optical cable in accordance with the invention.

The proposed solution to solve this problem is shown as the optical cable 10 in FIG. 3. Optical fiber cable 10 comprises a silica core 12 and cladding 13, for propagating light along its length. Silica core 12 and cladding 13 are surrounded by a plastic buffer 14. An LCP layer or jacket 16 of suitable thickness, determined by the desired tensile breaking strength, is extruded over buffer layer 14. A second layer 18 of very flexible thermoplastic, with a breaking strain in excess of 30 or 40%, is then extruded over the LCP layer 16.

Experiment has shown that by adjusting the thickness of this second layer the minimum bend radius of the cable can be significantly reduced. This is probably because, as the cable is bent, it does not kink or hockle. The thickness of the second layer depends on its breaking strain.

Liquid crystal polymers (LCPs) are a new class of materials ideally suited for use as extruded jacket for optical cables. LCP resins are commercially available from several major suppliers—Ticona, Allied Chemicals, Dupont and Sumitomo. LCPs have the following advantages:

a. No thermal degradation up to 450° C.; will meet 260° C. temperature rating (Jin, 1999).
b. Extremely low moisture absorption and transmission. No hydrolysis problem even at elevated temperatures.
c. Excellent chemical stability—no effect of immersion for prolonged periods in organic solvents, sulfuric acid, chromic acid, aviation fuels.
d. Tensile strength comparable to Kevlar.
e. LCP can be extruded on metal wires using conventional screw type extruders, and, therefore, cost much less than tape construction.

The LCP layer can be extruded on any buffered, singlemode or multimode optical fiber. The optical fiber may be any one of several commercially available optical fibers for applications such as telecommunications and optical sensors. The buffer on the fiber used could be any standard buffer or a multiplicity of layers, each layer made up of materials such as acrylate, silicone, polyimide, polyurethane or any other soft polymer chosen to reduce microbending losses in optical fiber (Handbook of Optical Fibers and Cables).

Figure 4A:
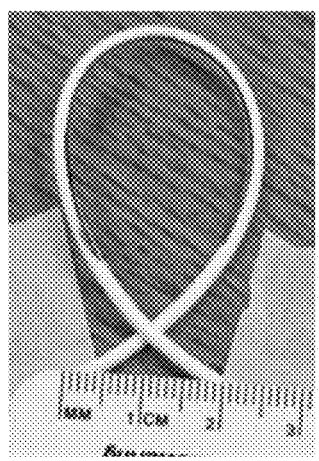
FIGS. 4a, 4b, and 4c are photographs showing the optical fiber cable of FIG. 3 jacketed with LCP followed with polyurethane layer as it progresses from a large open loop through a tighter loop and finally as it unfolds under tension from the tighter loop.
Figure 4B:
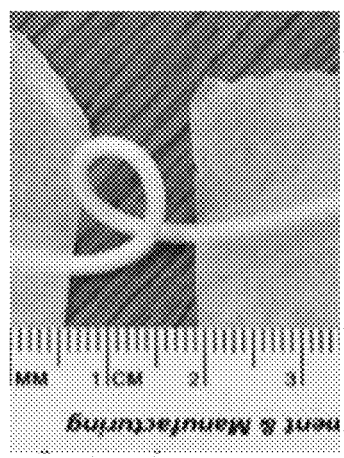
Figure 4C:
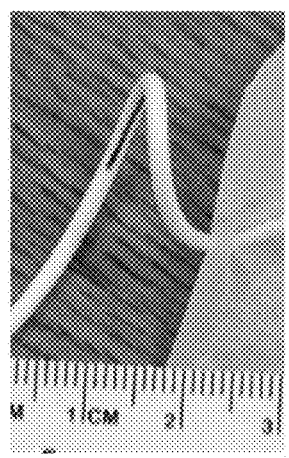

However, LCPs are not very flexible since their breaking strain is only a few percent. The second thermoplastic with high breaking strain, in excess of 40%, can be extruded on top of the LCP layer to significantly increase flexibility and non-kinkability of the cable. FIGS. 4a-c shows the behavior of a non-kink cable constructed in accordance with the invention, comprising an optical fiber jacketed with LCP followed with a, preferably, polyurethane layer. The fiber used was a commercial 10 mil single mode fiber with an acrylate buffer, jacketed with LCP to a 30 mil diameter, and final layer of polyurethane to diameter of 80 mil. As the loop diameter is reduced from about 2 cm in FIG. 4(a) to less than 1 cm in FIG. 4(b), the cable does not kink; instead the loop shrinks uniformly. When the loop diameter is further reduced from FIG. 4(b) to FIG. 4(c) the loop spontaneously opens up developing a 360° twist instead of kinking.

Many thermoplastics with breaking strain >30 or 40% can be chosen for the second layer; however, some preferred thermoplastics are shown in Table 1. The last row shows values for LCP for comparison purposes.

TABLE 1

Some preferred thermoplastics for non-kink optical cable contruction.

| Thermoplastic | Tensile Strength (kpsi) | Breaking strain (%) | Melting Point (° C.) | Specific Gravity |
|---|---|---|---|---|
| Polyurethanes | 2-10 | 200-600 | ≈200 | 1.14 |
| Polypropylene such as Santoprene | 2 | 580 | 204 | 0.96 |
| Polymethylpentene such as TPX | 3 | 48 | 227 | 0.83 |

TABLE 1-continued

Some preferred thermoplastics for non-kink optical cable contruction.

| Thermoplastic | Tensile Strength (kpsi) | Breaking strain (%) | Melting Point (° C.) | Specific Gravity |
|---|---|---|---|---|
| Extrudable Fluoropolymers | | | | |
| Perfluoroalkoxyethylene (PFA) | 3.6 | 300 | ≈300 | 2.15 |
| Fluorinated Ethylene Propylene (FEP) | 4 | 340 | 264 | 2.15 |
| Ethylene Tetrafluoroethylene (ETFE) | 6 | 300 | 255-280 | 1.7 |
| Polyetherimides like ULTEM ™ | 16.5 | 60 | 350 | 1.27 |
| Polyamides (Nylon) | 7 | 50 | 178 | 1.01 |
| Liquid Crystal Polymer such as Vectra A950 for comparison | 100 | 3 | 280 | 1.4 |

Figure 5:
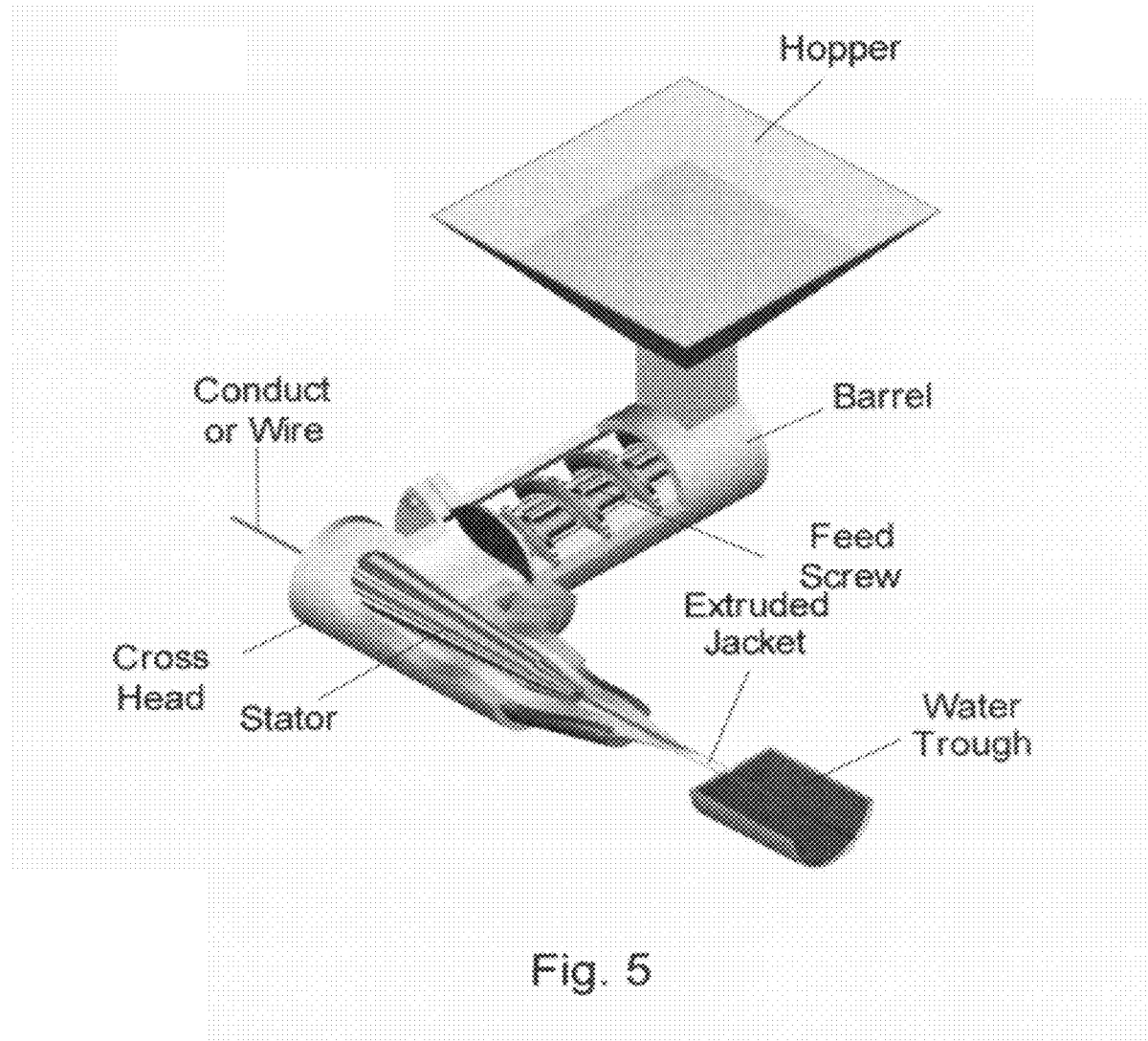
FIG. 5 is a diagrammatic perspective view of a basic crosshead type extruder that may be used in practicing the invention.

Both LCP layer 16 and secondary layer 18 are applied using standard extrusion technology. Extrusion is a well known manufacturing technology and enables low-cost, high performance cable constructions. Both layers on the optical fiber 12 are produced using a standard cross head extruder similar to that illustrated in FIG. 5. The extruder operates as follows:

The dried resin is poured into a hopper, which is located above the barrel. The resin moves from the hopper into the heated barrel and is pushed into the crosshead of the extruder by the feed screw. Before it enters the cross head, the now molten material passes through a screen (or group of screens) which serves to filter out any particulate contaminants which may be present. The material then flows along the outside of a hollow stator, through which the wire is fed. Finally, the molten material is extruded out of the cross head, through the die. At this point, the LCP is still molten, and the diameter of the extruded jacket continues to shrink as the material is pulled from the extruder. The jacketed wire then enters a water trough, where it is cooled rapidly, and the LCP hardens.

LCP molecules align primarily in the direction of extrusion so that tensile strength is significantly higher in this direction than in the transverse direction. However, others have shown that, by using a rotating die, LCP molecules can be aligned helically around the direction of extrusion (Lusignea, R. W.). Others have also used counter rotating dies (U.S. Pat. No. 6,064,007; Bernstein et al). This has the effect of producing a LCP layer with clockwise helical alignment along one wall and anti-clockwise alignment along the other wall. Bath these methods have the effect of reducing the tensile anisotropy in the extruded LCP as a result of which the flexibility of the LCP layer is improved. Either of these methods may be used in the present invention to improve flexibility or reduce tensile strength anisotropy.

The LCP layer provides tensile strength and excellent moisture resistance since LCPs have high moisture barrier properties. The second thermoplastic layer, in addition to producing a non-kink cable, has several other potential advantages some of which will now be discussed.

One problem encountered with some extruded LCPs is poor resistance to abrasion since the LCP layer tends to separate into fibers when abraded. Abrasion resistance can be increased by extruding a second abrasion resistant polymer on top of the LCP. In the present instant, the secondary layer applied for flexibility in FIG. 3 also suffices to increase abrasion resistance.

Note from Table 1 that some of the preferred thermoplastics for the second layer, such as polypropylene and polymethylpentene have specific gravity less than one. If one of these is used for the second layer the thickness can advantageously be chosen so that the average density of the cable is equal to or less than the density of sea water, typically 1.05. This makes the final cable neutrally buoyant or positively buoyant. In some oceanic underwater tether applications buoyancy is a desirable property since long lengths of deployed cable will float instead of being a weight burden on the ROV.

Further note from Table 1 that extrudable fluoropolymers have very high breaking strain and are an ideal choice for second layer. In addition fluoropolymers are very high temperature, chemically stable polymers, so that non-kink cables constructed with fluoropolymer second layer will be able to operate in high temperature and chemically harsh environments.

Having described the principles of the invention in connection with specific examples, other variants will occur to those skilled in the art, and it is the intend that such variants be within the scope of the appended claims.

What is claimed is:

1. A non-kink, non-hockling optical cable comprising: an optical fiber having a core having a given index of refraction and a cladding layer surrounding and in contact with said core and having an index of refraction lower than that of said core so that the two in combination are capable of propagating light along the length of said optical fiber;
    a buffer layer surrounding and in contact with said cladding of said optical fiber made of a soft plastic material;
    a supplemental layer surrounding and in contact with said buffer layer, said supplemental layer consisting essentially of a liquid crystal polymer (LCP) material to enhance the tensile strength of said optical fiber; and
    an encasing polymer layer surrounding and in contact with said supplemental layer, said encasing layer having a thickness and breaking strain for increasing the flexibility of said supplemental layer so that loops formed in said optical cable unfold to be converted into twists as the radius of the loops are tightened smaller than a predetermined limit, wherein the thickness and bending strain of said encasing layer are related as follows: $D=2d/(2r+d)$
    wherein D is the differential strain, d is the layer thickness, and r is the minimum bending strain radius and wherein the differential strain is 30% and the minimum bending strain radius is 0.25 inches.

2. The optical fiber of claim 1 wherein said buffer layer is one or more layers each made of different plastics.

3. The optical cable of claim 1 wherein said optical fiber comprises a single mode fiber.

4. The optical cable of claim 1 wherein said one or more buffer layers is acrylate, silicone or polyimide.

5. The optical cable of claim 1 wherein said encasing polymer layer comprises a thermoplastic selected from the group comprising polyurethane, polypropylene, polymethypentene, polyethedmide and polyamide.

6. The optical cable of claim 1 wherein said encasing polymer layer comprises a flouropolymer.

7. The optical cable of claim 1 wherein the encasing polymer layer has a specific gravity less than 1.

* * * * *